United States Patent [19]

Katsuragi et al.

[11] Patent Number: 5,062,736
[45] Date of Patent: * Nov. 5, 1991

[54] SNOW MELTING METHOD UTILIZING HEAT RETAINING FUNCTION OF UNDERGROUND AQUIFER WITHOUT SPRINKLING WATER

[75] Inventors: Kohei Katsuragi; Takayuki Hiyama, both of Yamagata,, Japan

[73] Assignee: Nihon Chikasui Kaihatsu Kabushiki Kaisha, Yamagota, Japan

[*] Notice: The portion of the term of this patent subsequent to Jun. 18, 2008 has been disclaimed.

[21] Appl. No.: 368,409

[22] Filed: Jun. 19, 1989

[30] Foreign Application Priority Data

Aug. 8, 1988 [JP] Japan .................................. 63-197688

[51] Int. Cl.$^5$ .............................. F24J 3/08; F28D 7/12
[52] U.S. Cl. .......................................... 404/72; 404/79; 405/234; 165/45
[58] Field of Search ....................... 404/71, 72, 79, 61; 405/131, 234; 126/343.5 R; 165/45

[56] References Cited

U.S. PATENT DOCUMENTS

| | | | |
|---|---|---|---|
| 1,581,088 | 4/1926 | Pearce | 405/131 |
| 2,637,531 | 5/1953 | Davidson | 165/45 |
| 3,195,619 | 7/1965 | Tippmann | 405/234 X |
| 3,236,991 | 2/1966 | Graham et al. | 404/41 X |
| 3,521,699 | 7/1970 | Van Huisen | 165/45 X |
| 4,139,321 | 2/1979 | Werner | 405/154 |
| 4,452,303 | 6/1984 | Bontje et al. | 165/142 |
| 4,693,300 | 9/1987 | Adachi | 165/1 |

*Primary Examiner*—William P. Neuder
*Attorney, Agent, or Firm*—Ladas & Parry

[57] ABSTRACT

Snow lying on a road or building structure is melted and removed without sprinkling water on the snow by pumping up from a well and circulating underground water, which is contained in an underground aquifer and warmed by geothermy of the aquifer utilizing the heat retaining function thereof, through pipe arrangement laid under the surface of the road or building structure. The used and cooled underground water is returned into another artesian well without being wasted and exposed to the atmosphere. Underground water warmed by the solar heat and stored in the aquifer in a hot season may be preferably used in a cold snow season. An antifreezing liquid may be filled and circulate in the pipe arrangement to perform effective heat transfer through a heat exchanger between the antifreezing liquid and the underground water which circulates from one well to the other well. A pipe having excellent crystal structure of the welded joint portion can be used for the pipe arrangement.

2 Claims, 5 Drawing Sheets

SNOW MELTING METHOD UTILIZING HEAT RETAINING FUNCTION OF UNDERGROUND AQUIFER WITHOUT SPRINKLING WATER

BACKGROUND OF THE INVENTION

This invention relates to a method of melting snow by utilizing heat retaining function of an aquifer located in a deep region of the ground without sprinkling water on the snow, and more particularly to a method of melting snow lying on a road or building structure by utilizing only the heat of underground water stored artificially in the ground and returning the used water again into the ground for reusing the same.

Recently, a method of melting and removing snow which has fallen on roads or building structures in a snowy and cold area by sprinkling underground water has widely been carried out. This method, however, is accomplished by a significant problem that because the underground water after being sprinkled for melting the snow is caused to flow into gutters, for example, at the sides of the roads and then caused to flow through rivers into the sea, the underground water as water resources is gradually reduced, and in a certain case, the reduction of the underground water may cause a subsidence of the ground.

In order to obviate the problem mentioned above, in the prior art, Japanese Patent Laid-Open (Kokai) No. 49-59429 (59429/1974) discloses a method and system for heating water for melting snow lying on a road by utilizing the heat of the underground water. In this prior art, the system comprises underground water pumping means located in two artesian wells formed to reach the aquifer near the ground surface, pumping means for pumping up river water or lake water, a heat exchanger, snow melting pipe means, and snow melting nozzles. In the use of the system of this type, river water or lake water having a temperature of about 1° C. in a snowy season is heated to a temperature of about 7°~8° C. through the heat exchanger by utilizing the underground water of about 14° C. as a heat source, and the thus heated river water or lake water is sprinkled through the snow melting nozzles thereby to melt the snow which has fallen on the road or the like.

Japanese Utility Model Publication No. 45-25945 (25945/1970) teaches of a road of the character in which a carbonic or carbon containing material is mixed in a concrete or asphalt pavement layer constituting the surface layer of the road such as speedways in the snowy and cold season to endow the road with the heat conductive property. In the thus formed road surface layer is laid an underground water passage having a discharge port opened to the outside of the road. According to the road of this character, the snow lying on the road is melt by passing through the passage the pumped up underground water near the ground surface having generally a temperature of about 10° C. throughout the seasons, and the used underground water is then discharged into a river or lake.

The prior art technique described above, however, is accompanied by the following problems.

In the technique or method disclosed in the Japanese Patent Laid-Open No. 49-59429, the river or lake water having a temperature of about 1° C. is heated merely to 7°~8° C. through the heat exchanger by the underground water of about 14° C., and hence, the heat transfer efficiency is not good and remarkable snow melting effect cannot be expected. In addition, since it is considerably difficult to evenly sprinkle the water over the road and unmelted snow may freeze, which is dangerous for drivers of cars and walkers, and moreover, a great amount of the underground water and the river water are needed for melting the snow on the road because of the heat exchanging operation between the underground water of about 14° C. and the river water of about 1° C., which is considerably lower than that of the former, so that a great amount of water are spread over the road surface and the spread water may be spattered by a running car to walkers or private houses or buildings along the road.

In the technique or method disclosed in the Japanese Utility Model Publication No. 25945/70, since the underground water near the ground surface is utilized for melting snow and discharged after being used into a river through a discharge port disposed outside of the road, the underground water as the water resources is gradually reduced, which may be a cause of subsidence of the ground, a serious social problem. In addition, since the underground water near the ground surface generally has a temperature of about 10° C., being a relatively low temperature, a great amount of the underground water is required to effectively melt and remove the snow which has fallen on the road.

SUMMARY OF THE INVENTION

An object of this invention is to eliminate the problems or drawbacks in the prior art technique for removing snow lying on a road or the like and to provide a method for melting snow lying on the road or the like without sprinkling water and by utilizing the heat retaining function of an aquifer of the underground.

According to a feature of this invention, the underground water warmed by the geothermy in the aquifer is circulated through pipe means laid under substantially the entire surface of the road or the like, or the underground water warmed by the solar heat in a hot season is circulated through the pipe means in a cold snow season.

According to a further feature of this invention, an antifreezing liquid is caused to circulate in the pipe means and heat exchange operation is performed between the antifreezing liquid and the underground water having a temperature kept by the heat retaining function of the aquifer.

As pipe means to be laid under the surface of a road or the like, a special pipe having a superior welded joint structure can be used.

According to this invention, the object can be achieved by providing a method of melting snow lying on a road or building structure without sprinkling water and by utilizing a heat retaining function of an aquifer in a deep region of the ground, the method being characterized in that, in a cold snow season, underground water warmed by geothermy in the aquifer is pumped up from a first artesian well and caused to flow through pipe means laid under the surface of the road or building structure to store and transfer heat of the underground water to the surface thereof thereby to melt the snow lying on the surface, the underground water once used and cooled by the heat transfer is returned into the aquifer through a second artesian well, and the returned underground water is stored in the second well in which the returned underground water is warmed to a normal temperature of the underground water by the heat retaining function of the aquifer for the use of the next cold snow season.

In another aspect of this invention, the snow melting method is characterized in that underground water warmed in a hot season by solar heat is stored in a first artesian well in a portion of an aquifer while keeping a raised temperature thereof as a warmed underground water by utilizing the heat retaining function of the aquifer, the underground water warmed and stored in the aquifer is pumped up from the first well and caused to flow through pipe means laid under the surface of a road or building structure to store and transfer heat of the underground water to the surface thereby to melt the snow lying thereon in a cold snow season, the underground water once used and cooled by the heat transfer is returned through a second artesian well into a portion of the aquifer, the returned underground water being stored there while keeping a lowered temperature thereof as a cooled underground water by utilizing the heat retaining function of the aquifer, the cooled and stored underground water is pumped up from the second well and caused to flow through the pipe means to receive the solar heat in the next hot season to warm the underground water, and the warmed underground water is returned to the first well and stored there for the next cold snow season.

In a further aspect of this invention, the snow melting method is characterized in that a first artesian well and a second artesian well are connected through conduit means incorporating heat exchanging means to cause underground water to-flow from one of the first and second wells to the other, and both ends of the pipe means in which an antifreezing agent is filled and circulates, and which is laid under the surface of a road or building structure are connected through conduit means passing through the heat exchanging means so as to perform heat transfer between the antifreezing liquid and the underground water in the heat exchanging means.

In preferred embodiments of the snow melting method described above, the pipe means is arranged substantially over the entire surface of the road or building structure, and comprises a plurality of pipe sections in which adjacent two pipe sections are fused by irradiating throttled high energy beam and then rapidly quenching the fused portion by flowing cooling gas thereby to form a weld joint between the adjacent two pipe sections having an excellent crystal structure.

Preferred embodiments of this invention will now be described with reference to the accompanying drawings.

DESCRIPTION OF THE PREFERRED EMBODIMENTS

The snow melting method according to this invention is generally carried out in consideration of the heat retaining function of the underground aquifer. The heat retaining function of the aquifer will be described hereunder. For example, when warm water having a temperature of about 28° C. is fed into the aquifer generally with a void ratio of about 30%, rocks, gravels, sands and the like in the aquifer are warmed to thereby form a warm water zone. The warm water zone is gradually developed into a wide range zone, thus retaining heat energy in the aquifer due to the heat retaining function of the aquifer. Conversely, when cold water is fed into the aquifer, a cold water zone is formed there.

Preferred embodiments of the non-water-sprinkling type snow melting method according to this invention will be described in detail hereunder by taking the above fact into consideration.

First Embodiment

Figure 1:
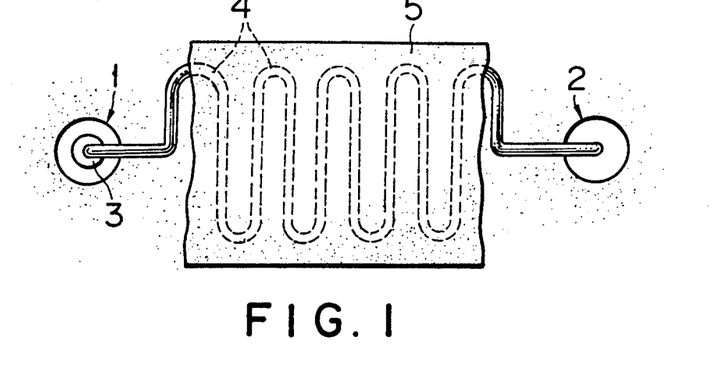
FIG. 1 is a schematic plan view explanatory of first and second embodiments of this invention.
Figure 2:
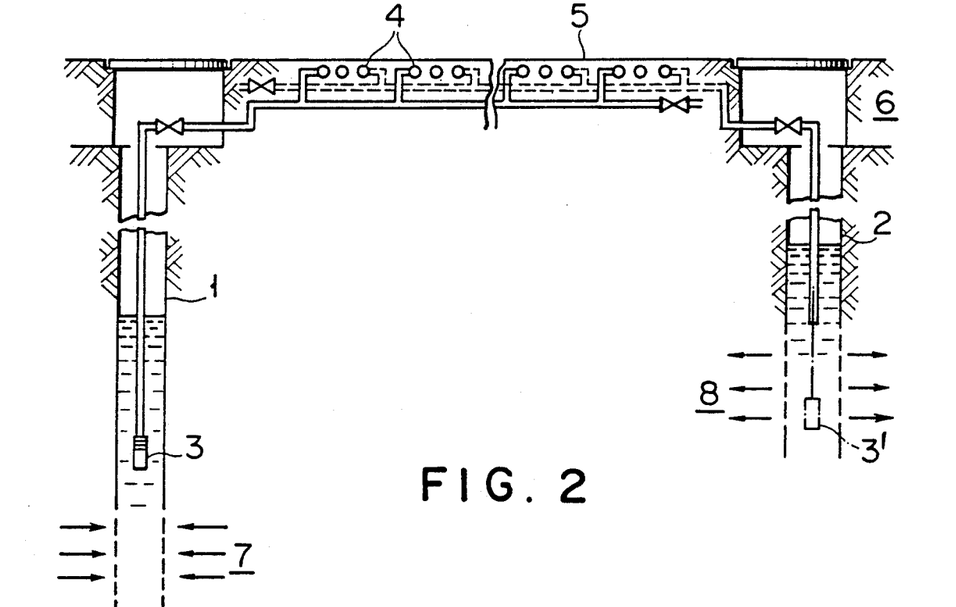
FIG. 2 shows a schematic sectional elevation explanatory of the first and second embodiments of this invention.
Figure 3:
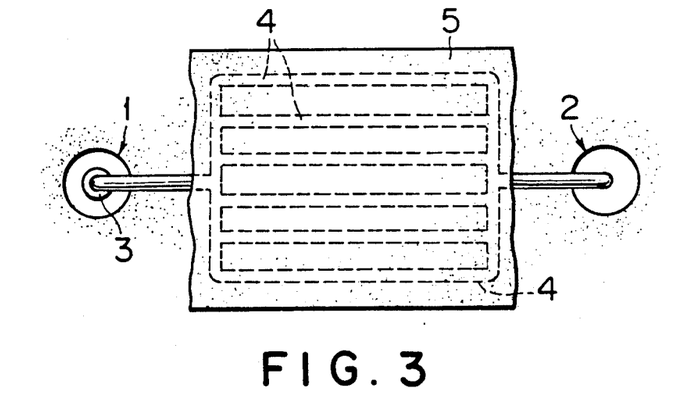
FIG. 3 is a view showing a modified example of FIG. 1.
Figure 4:
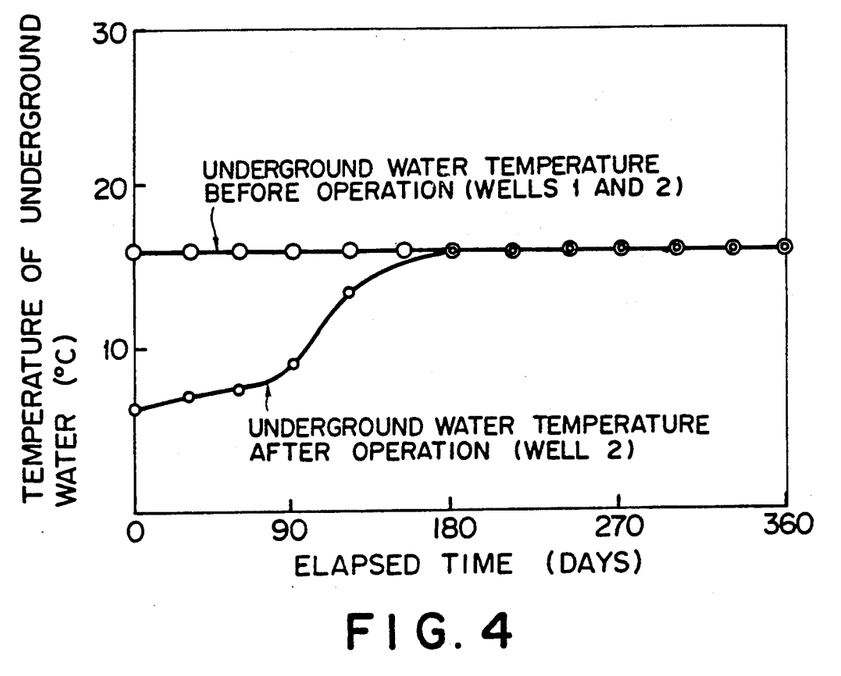
FIG. 4 is a graph representing underground water temperature with elapsed time with respect to the first embodiment.
Figure 5:
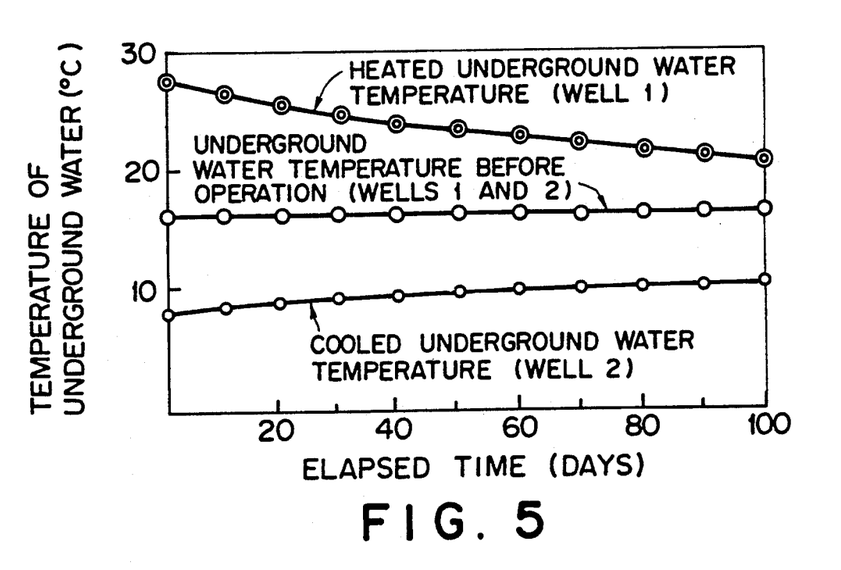
FIG. 5 is a graph representing heated and cooled underground water temperatures with elapsed time with respect to the second embodiment.

FIGS. 1 and 2 represent a case in which this invention is applied for melting and removing snow lying on a road. Referring to these figures, at least two artesian wells 1 and 2 are formed, and a heat discharging and heat collecting pipe (or pipes) 4 is laid under substantially the entire surface of the road 5 in a meandering, bent, parallel (as shown in FIG. 3), spiral, zigzag, or the like form. The depth of the well 2 is at least two-thirds of that of the well 1. The distance between the wells 1 and 2 is from 30 to 150 meters. The pipe 4 can of course be arranged in another place such as in a building structure, under a bed of a railway suitable for melting the snow. The ends of the pipe 4 are respectively connected to the wells 1 and 2 through conduits, for example. According to this construction or combination of the wells and the pipe arrangement, the underground water in an aquifer 7 located beneath the ground surface about 50~200 meters therebelow can be pumped up by the operation of a pump 3 from the well 1, the underground water in the aquifer 7 being maintained at about 15°~18° C. even in a cold season as shown in FIG. 4. Accordingly, in the cold season, by causing the thus pumped up warm underground water to flow through the pipe 4 laid under the road 5 or in a building structure preferably at a speed of 0.3~1.5 meter/sec, the heat of the underground water is stored in the road and then transferred to the road, whereby the snow which has fallen on the road 5 or the building structure can be gradually melted, and hence, the freezing of the road surface can also be prevented by the heat transferred from the pipe 4.

The underground water thus used for warming the pipe 4, generally having a temperature of from about 7° to 8° C., is then returned through a conduit to the other well 2 and stored in the deep portion of the ground, thus forming a cold water zone 8. In this manner, the used water is again returned or recovered to the aquifer 7 from the ground surface 6 to reuse the same without being exposed to the atmosphere, thus preventing the underground water from being wasted and contaminated.

As shown in the graph of FIG. 4, the underground water after being used and returned in the aquifer 7 in the well 2 is gradually warmed as time elapses, and in about 6 months the temperature of the once used underground water is raised again to the normal temperature of the underground water of about 15~18° C., which is stored there under a thermally insulated condition for the use in the next cold snow season.

As described above, according to this embodiment, the snow which has fallen on the road or building structure can be effectively melted and removed without sprinkling water thereon and without using a great amount of the underground water in a superior manner in comparison with the conventional method of removing the snow on the road or the like.

Second Embodiment

A second embodiment of the method for melting and removing snow which has fallen on a road or the like according to this invention will be described hereunder also with reference to FIGS. 1, 2 and 3. In the second embodiment, hot or warm water heated to a temperature above 25° C. by the solar heat in the heat or hot season and stored in the well 1 formed in the aquifer 7 laid in the deep portion under the ground surface of about 50~200 meters is utilized in the cold snow season by pumping up the stored water and circulating the same through the pipe arrangement 4 disposed beneath the road 5 in the manner described in detail hereunder.

The water heated by the solar heat in the hot season and stored in the aquifer 7 is maintained at a temperature of about 23°~25° C., in the cold snow season which is considerably higher than the temperature of about 15°~18° C., the normal temperature of the ground water due to the heat retaining function of the aquifer 7.

According to the second embodiment of the snow melting method of this invention, the thus heated and stored water is pumped up by the pump 3 from the well 1 and circulated through the heat discharging and heat collecting pipe(s) 4 laid under the road 5 thereby to melt and remove the snow which has fallen on the road 5, building structure or the like, thus preventing the snow or melted water from freezing on the road or the like. The water, after being used for melting the snow, has generally a temperature of about 7° C. and is retained into the cold water zone 8 in the other well 2 as a cooled water.

According to the second embodiment, the water returned in the well 2 is utilized in the next hot season in the following manner. The returned water, having a temperature of about 7~10° C. in summer season, which is lower than the normal underground water temperature of about 15~18° C., is pumped up by the operation of a pump 3', shown by imaginary lines in FIG. 2 and, after being used for cooling houses, is circulated through the pipe 4 thereby to cool the road 5, building structure or the like and to prevent the pavement of the road from softening in the hot season. The cool water from the well 2 is heated through the heat transfer from the heated road and building structure during the circulation through the pipe 4, and the thus heated water, having a temperature of about 28° C. is returned to the well 1 into the deep aquifer 7 without being exposed to the atmosphere. The heated water thus returned in the well 1 forms a warm water zone in the aquifer 7 considerably below the ground surface zone 6 and is stored there as a heated water for melting the snow on the road or building structure in the next cold snow season in the manner described hereinbefore.

According to the method of this embodiment, the underground water used for melting the snow on the road or the like in the cold snow season can be effectively reused for cooling the road, building structure or the like in the hot season without being exposed to the atmosphere, so that the ground water as a water source can be kept without being wasted and contaminated.

Third Embodiment

Figure 6:
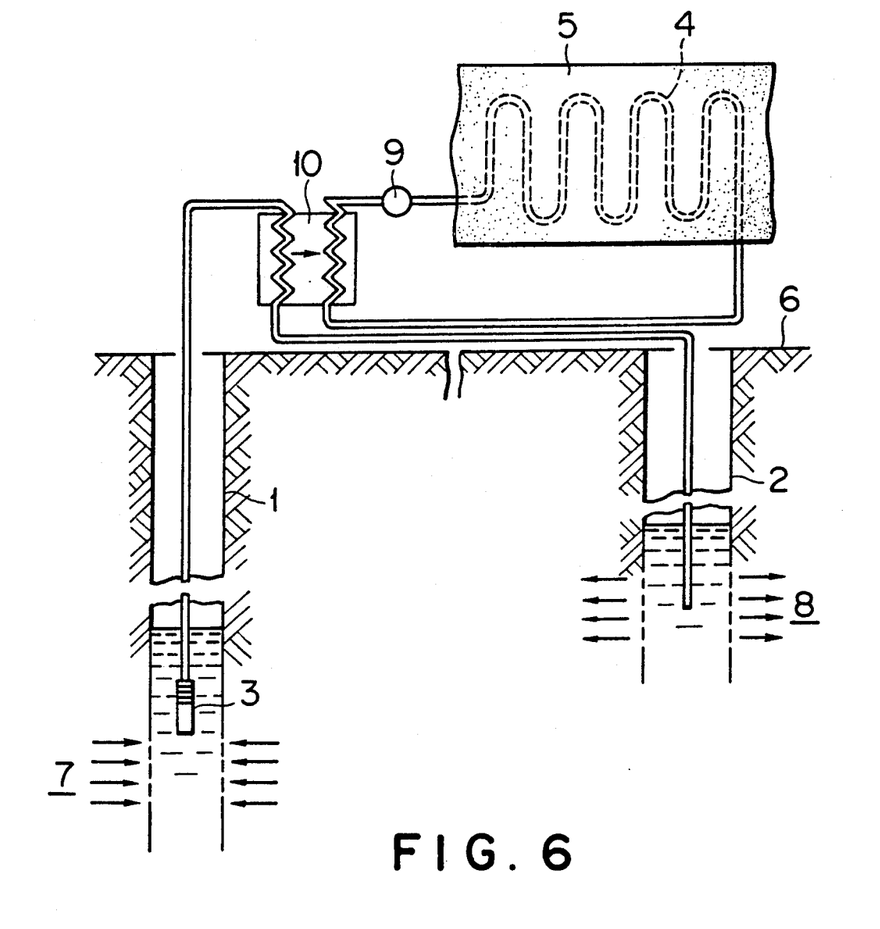
FIG. 6 is a schematic view, partially in section, explanatory of a third embodiment of this invention.

A third embodiment of the snow melting method according to this invention will be described hereunder with reference to FIG. 6, in which the underground water in the well 1 pumped up by the operation of the pump 3 flows into the other well 2 through a conduit passing through a heat exchanger 10. The pipe 4 laid under the pavement surface of the road 5 is filled with an antifreezing liquid, which is circulated in the pipe 4 by the actuation of a pump 9 incorporated in a conduit connecting both ends of the pipe 4. According to this arrangement, the heat of the underground water is transferred to the antifreezing liquid when the underground water passes through the heat exchanger 10, and the heat transferred to the antifreezing liquid is in turn transferred to the road 5 and is stored in the road 5 when the antifreezing liquid circulates through the pipe 4 thereby to melt the snow lying on the road 5. A heat pump may preferably be used as a heat exchanger 10.

In this embodiment, the underground water warmed by the solar heat in the hot season is stored in the well 1 and the cold underground water, after the heat transfer in the heat exchanger 10, is stored in the well 2.

According to this embodiment, since the antifreezing liquid is filled in the pipe 4, an accidental breaking of the pipe 4, which may be caused by the freezing of the water in the pipe 4 after stopping the operation of the pump 9, can be effectively prevented.

In the aforementioned three embodiments, the heat discharging and collecting pipe 4 is arranged under the road surface 5 so as to warm or cool the road surface substantially entirely, a pipe having the following characteristics or structures can preferably be utilized according to this invention. These characteristics and structures will be described hereunder with reference to FIGS. 7 and 8.

Figure 7:
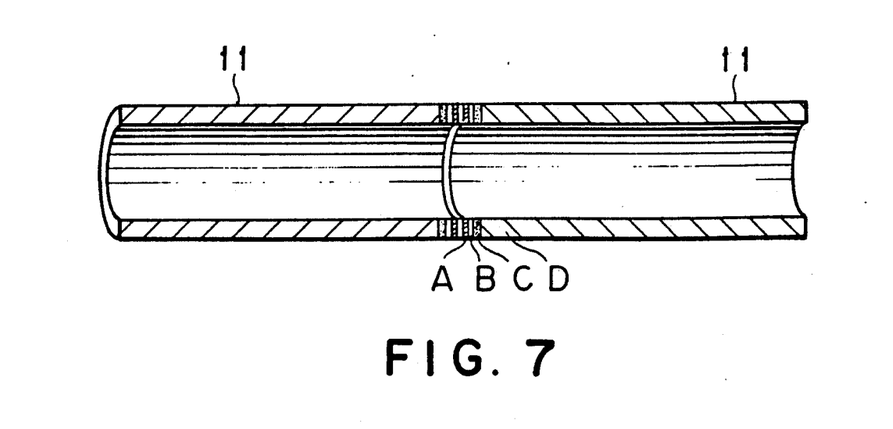
FIG. 7 shows a longitudinal section of welded portion of pipe sections constituting a pipe to be used preferably for the embodiments of this invention.

A pipe used in this invention as the pipe 4 has a chemical composition prescribed by the Japanese Industrial Standards (JIS) G-3452 and is usually composed of a plurality of pipe sections. An end face of one pipe section is abutted against an end face of another pipe section. The abutted portion is welded by means of throttled high energy beams such as Tig welding, and the thus welded portion is quenched rapidly by flowing argon gas through nozzle means thereby to form a welded joint, thus forming a heat discharging and collecting pipe.

Figure 8A:
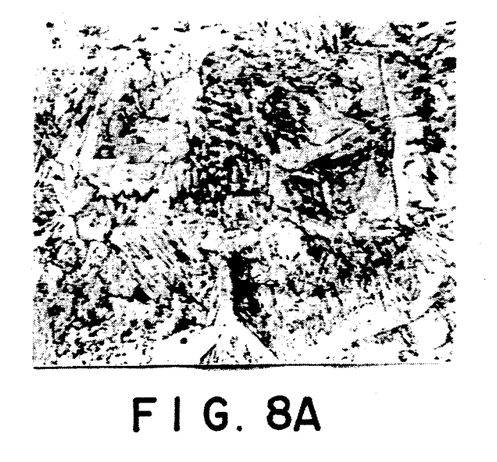
FIGS. 8A to 8C are photomicrographs showing crystal structures of the portions near the welded portion of the pipe sections shown in FIG. 7.
Figure 8B:
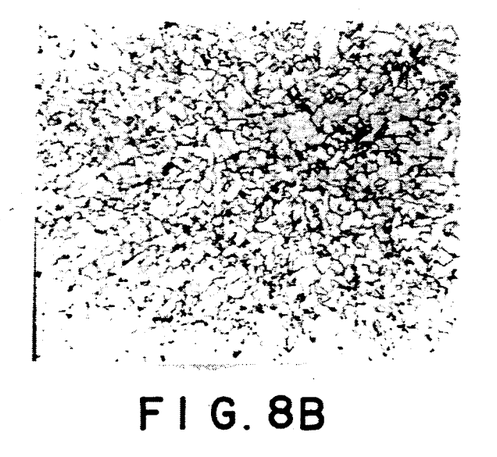
Figure 8C:
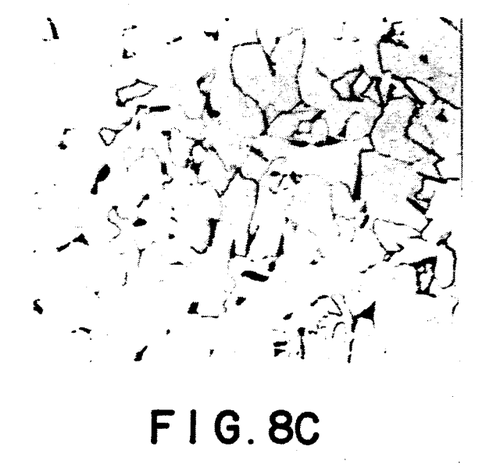

FIGS. 8A, 8B and 8C are photomicrographs representing crystal structures of the welded joint portions treated by the welding heat in the above-mentioned welding method, in which the photomicrograph of FIG. 8A represents a martensitic structure of a portion of a pipe adjacent the welded portion, the photomicrograph of FIG. 8B represents a mixed structure of a fine pearlite and the martensite adjacent to the martensitic structure, and the photomicrograph of FIG. 8C represents a pearlite structure adjacent the structure of B. D designates the base steel pipe.

As described above, the throttled high energy beam is irradiated to the abutting portions of the pipe sections to form a welded joint, and the cooling gas is then blowed to the welded portion to rapidly quench the same.

The thus formed heat discharging and collecting pipe has a martensitic structure, a mixed structure of the martensite and fine pearlite, and the fine pearlite structure from the welded portion towards the base material of the pipe in this order. No protruded or other deformed portion was observed in the welded portion of the thus formed pipe, and hence, the smooth welded surface is obtained. In a strength test of ten pipes thus formed, carried out by bending the respective one by about 90°, no break or crack was observed.

Figure 9:
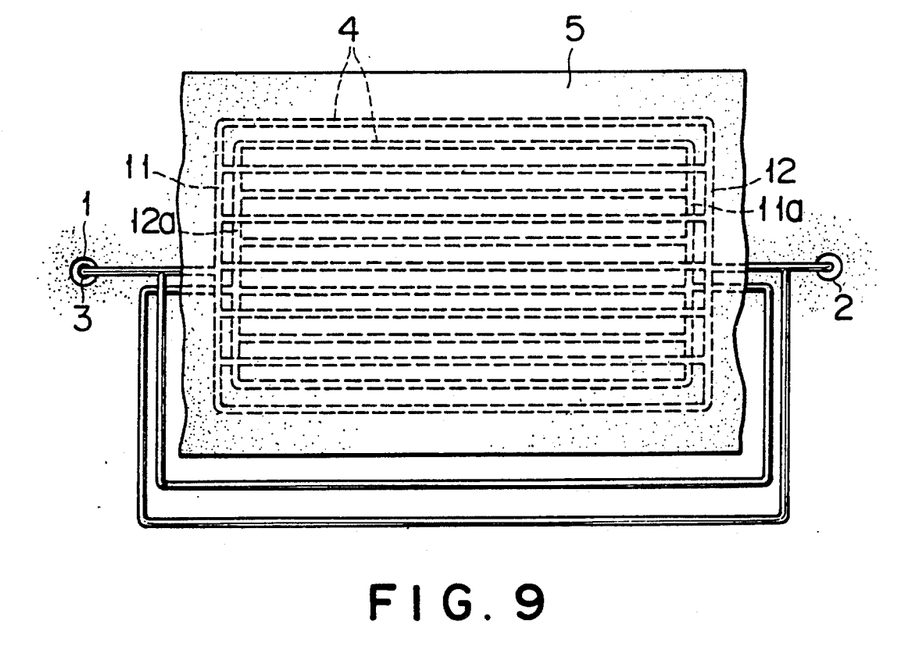
FIG. 9 shows a plan view of an example of heat collecting and discharging pipes usable in this invention.

FIG. 9 shows an example of the heat collecting and discharging pipes 4 laid under the surface of the road 5 or the like. The chemical composition of the pipe is that prescribed by the Japanese Industrial Standards (JIS) G-3452. The length of each straight pipe is approximately 100 meters, and water is caused to pass in counterflow in adjoining pipes. One ends of one set of pipes 4 are connected to a feed header 11, and the other ends of the one set of pipes are connected to a return header 12, while one ends of the other set of pipes 4 are connected to another feed header 11a, and the other ends of the other set of pipes are connected to another return header 12a. The above stated structure may also be applied to parking places, runways for aircrafts, tennis courts, running tracks, platforms, wharfs and so on.

As described hereinbefore, according to the non-water-sprinkling type snow melting method, of this invention, utilizing heat retaining function of the aquifer in the deep underground portion, snow lying on roads or building structures is effectively melted in the cold snow season to thereby prevent the road surface from freezing by circulating warm underground water through a pipe laid under the road surface. Moreover, the cooled underground water, after being used for melting the snow, is returned to the aquifer to form a cold water zone, and the returned cooled water is gradually warmed by the geothermy of the deep portion of the ground to a normal temperature of the underground water for the use of the next cold snow season. Accordingly, in comparison with the conventional water sprinkling snow melting method, more effective and economic snow melting and removing effect can be attained, by using relatively small amount of the underground water. In addition, the underground water is not sprinkled and can be reused without exposing to the atmosphere, thus preventing the underground water from being wasted and contaminated, and hence, a problem of subsidence of the ground can be obviated.

In another viewpoint, the underground water used and cooled for melting the snow in the cold snow season can be used for cooling the road or building structure by circulating the same through the pipe arrangement laid under the road surface or the like in the hot season. The underground water used for cooling the road is heated by the solar heat during the circulation through the pipe arrangement and the thus warmed underground water is returned to the well for the reuse thereof in the next cold snow season.

In a further aspect of this invention, the pumped-up underground water is circulated from one well to the other well through a heat exchanger and an antifreezing liquid filling the pipe laid under the road surface circulates through the heat exchanger, in which heat is transferred from the underground water. Accordingly, even in a case where the circulation of the antifreezing liquid stops after melting the snow on the road, the road surface as well as the interior of the pipe is never frozen, thus ensuring the safe operation and reduction of the maintenance cost.

Furthermore, since the pipe to be laid under the road surface has the improved structure, the improved strength and flexibility are achieved, and moreover, welded portions of the pipe sections have no protruded or other deformed portion, enabling the free pipe arrangement, and the pipe is durable for a long time use without forming breaks or cracks. Such pipe is very suitable for a pipe to be laid under the road surface through which the underground water circulates in accordance with the snow melting method of this invention.

What is claimed is:

1. A method of melting snow lying on a structure above the ground by utilizing a heat retaining function of an aquifer located in a deep region of the ground, said method comprising the steps of:
   (a) pumping up through a first artesian well, in a cold snow season, underground water warmed by geothermy to a temperature of from 15° to 18° C. in an aquifer from 50 to 200 meters below the surface of the ground;
   (b) causing the pumped up water to flow at a speed of 1.5 meters per second through pipe means laid in said structure to store heat of the underground water in the structure and to transfer the heat of the underground water to snow lying thereon to melt the snow;
   (c) returning through a second artesian well the underground water once used and cooled by heat transfer to a temperature from 7° C. to 8° C. into a second aquifer which has a depth of at least two-thirds of said first mentioned aquifer;
   (d) storing the underground water returned through the second well in the second aquifer to warm the returned underground water in about six months to a temperature from 15° to 18° C. by the heat retaining function of the second aquifer;
   (e) pumping up through the second artesian well, in the next cold snow season, the underground water in the second aquifer;
   (f) causing the pumped up water from the second artesian well to flow at a speed of 1.5 meters per second through said pipe means to melt the snow on said structure;
   (g) returning the underground water used and cooled in the pipe means for the second time into the first aquifer through the first artesian well;
   (h) storing the underground water returned through the first well in the first aquifer to warm the returned water by the heat retaining function of the first aquifer; and
   (i) repeating the above steps every two years.

2. A method of melting snow lying on a structure above the ground by utilizing a heat retaining function of an aquifer located in a deep region of the ground, said method comprising the steps of:
   (a) heating underground water to a temperature of about 28° C. in a hot season by solar heat;
   (b) returning the thus heated underground water through a first artesian well into a first aquifer to store the water in the aquifer while suppressing lowering of the raised temperature of the returned water by utilizing the heat retaining function of the aquifer.

(c) pumping up through a first artesian well, in a cold now season, the underground water stored in the first aquifer at a higher temperature of about 25° C. than normal underground water temperature;

(d) causing the pumped up underground water to flow through pipe means laid in said structure to store heat of the underground water in the structure and to transfer the heat of the underground water to snow lying on the structure thereby to melt the snow lying thereon;

(e) returning through a second artesian well the underground water once used and cooled to a temperature of about 7° C. after the heat transfer into a second aquifer;

(f) storing the returned underground water in the second aquifer while suppressing raising of the lowered temperature thereof by utilizing the heat retaining function of the second aquifer;

(g) pumping up, in the next hot season, the cooled and stored underground water of about 10° C. from the second aquifer through the second well and causing the pumped up water to flow through said pipe means to heat the water by the solar heat; and (h) repeating the above steps in the subsequent years.

* * * * *